Jan. 31, 1950 G. H. TAYLOR, JR 2,496,026
FREQUENCY MULTIPLIER SYSTEM
Filed April 22, 1944
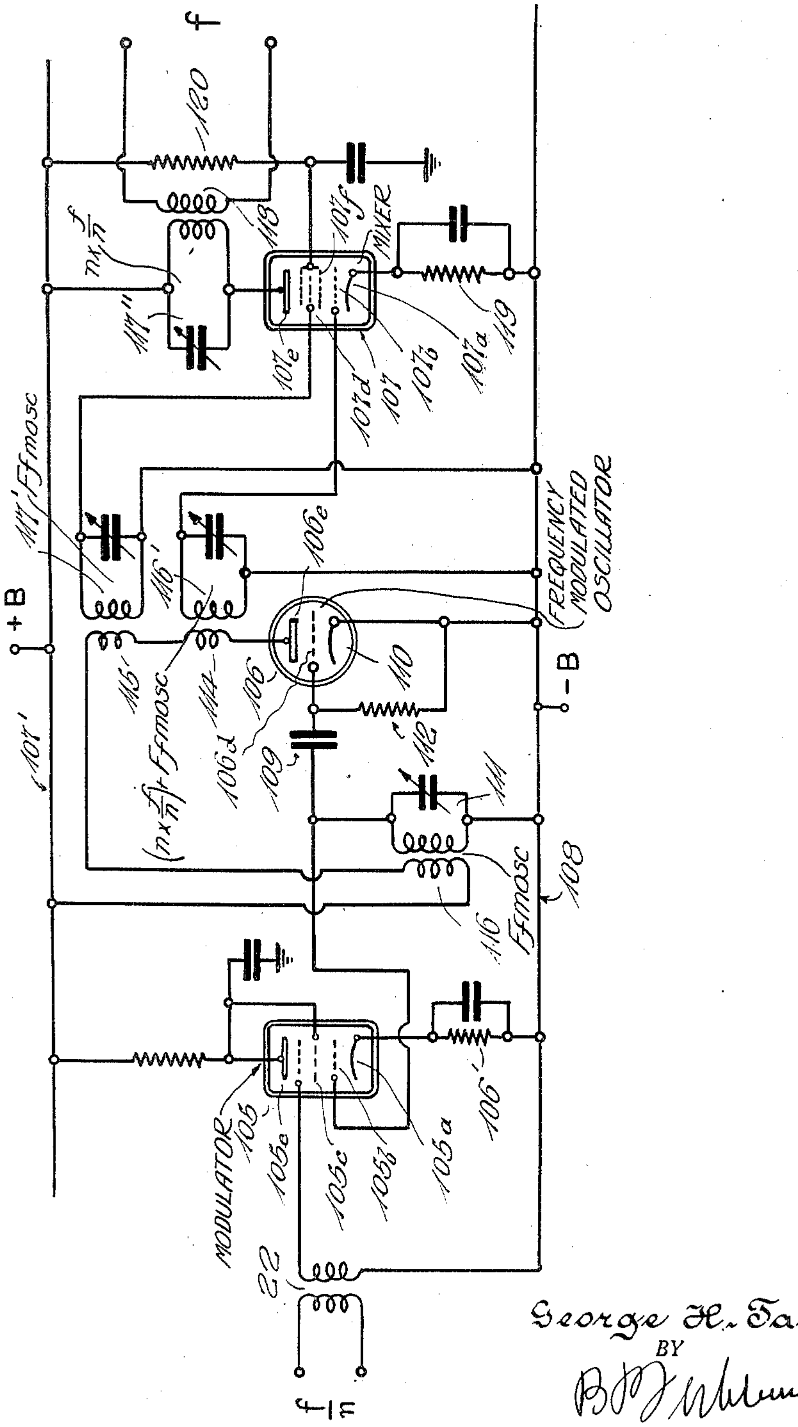
INVENTOR.
George H. Taylor, Jr.
BY
B. [signature]
ATTORNEY Patented Jan. 31, 1950

2,496,026

UNITED STATES PATENT OFFICE 2,496,026

FREQUENCY MULTIPLIER SYSTEM

George H. Taylor, Jr., Fort Lauderdale, Fla.

Application April 22, 1944, Serial No. 532,306

4 Claims. (Cl. 250—36)

My invention relates broadly to communication systems and more particularly to a radio communication system having a high degree of selectivity permitting the efficient utilization of the available frequency spectrum.

One of the objects of my invention is to provide a system of radio communication for transmitting and receiving a particular type of high frequency energy and arranged to overcome the difficulties caused by side bands which normally interfere with efficient communication.

Another object of my invention is to provide an improved circuit arrangement for a frequency multiplier system operating on a linear law.

Still another object of my invention is to provide a frequency multiplier circuit employing a frequency modulated oscillator associated with a mixer circuit and including a pair of independently tunable circuits coupled with the output system of the frequency modulated oscillator for effecting linear law frequency multiplication.

A further object of my invention is to provide a circuit for a frequency modulated controlled frequency multiplier as set forth in the specification hereinafter following by reference to the accompanying drawing which illustrates one of the methods I employ for effecting linear law frequency multiplication without undesired frequencies in the system of my invention.

The circuit diagram illustrates a form of circuit which may be employed in a transmission system. The input circuit constituted by transformer 22 connects to a linear law frequency multiplier circuit which is a frequency modulated controlled frequency multiplier. The multiplier comprises an arrangement of tubes represented at 105, 106 and 107. Tube 105 is a modulator embodying cathode 105*a*, inner grid 105*b*, screen grid 105*c*, control grid 105*d* and anode 105*e*. The bias on control grid 105*d* is regulated by the arrangement of cathode resistor 106′. The input circuit from transformer 22 connects between control grid 105*d* and cathode 105*a*. The output circuit is supplied with positive potential from the positive bus indicated at 107′. The potential supply for the output circuit is completed from the negative side of the B potential source to bus 108 to cathode 105*a* as shown. An electron coupling is provided between the modulator 105 and the input circuit of the frequency modulated oscillator shown at 106 by means of the connection of the control grid 106*d* of tube 106 through condenser 109 to the inner grid 105*b*. The cathode 110 of the frequency modulated oscillator 106 connects to the bus 108 forming the opposite side of a portion of the output of modulator tube 105. A tuned coupling circuit 111 is interposed between the output of modulator 105 and the input of the frequency modulated oscillator 106. Suitable bias is maintained on control grid 106*d* through resistor 112. The anode 106*e* of the frequency modulated oscillator 106 is connected in circuit with the series connected inductances 114, 115 and 116 to the positive bus 107′ to which the output of modulator 105 also connects. Inductance 116 is coupled with the inductance forming part of the tuned circuit 111. Frequency modulated energy is thus fed back from the output circuit of the frequency modulated oscillator 106 to the input circuit through the series path constituting inductances 114, 115 and 116 establishing energy which might be designated $F_{fmosc}$ with respect to the applied $$\frac{f}{n}$$

energy at the transformer input circuit 22. The tube 106 has its output circuit coupled through two separately tuned channels 116′ and 117′ leading to the inner grid 107*b* and the control grid 107*d* of the mixer tube 107. The mixer tube 107 includes cathode 107*a*, inner grid 107*b*, shield 107*f*, control grid 107*d* and anode 107*e*. Anode 107*e* connects through tuned circuit 117″ to the positive bus 107 and provides means for connection of the output coupling circuit indicated at 118 thereto for delivering output energy at frequency *f*. The required bias potential is supplied to the control grid 107*d* through the biasing circuit 119. The required potential is applied to shield grid 107*f* through resistor 120. The energy transferred from winding 115 to tuned circuit 117 may be designated $F_{fmosc}$ while the energy transferred from winding 114 to tuned circuit 116 for impression upon control grid 107*b* may be designated $$n\times\frac{f}{n}+F_{fmosc}\left(n\text{ times }\frac{f}{n}\text{ plus }F_{fmosc}\right)$$

These frequencies are mixed in the circuits of tube 107 producing in the output tuned circuit 117 a frequency $$n\times\frac{f}{n}\left(n\text{ times }\frac{f}{n}\right)$$

delivering to the output circuit 118 energy of frequency *f* as compared to the input frequency of $$\frac{f}{n}$$

In the diagram, circuit 111 is tuned to any oscillating frequency. Circuit 117 is tuned to the same frequency as circuit 111. Circuit 116 is tuned to the desired component of the frequency modulation side-band frequency, which is some multiple of the fundamental modulation frequency of the circuit plus the oscillator frequency. Circuit 117 is tuned to the desired multiple or harmonic of the input frequency to circuit 22. The circuit of my invention operates as follows: the pentode grid-cathode capacity is varied by the changes in mutual conductance caused by the input voltages. These variations of interelectrode capacity are utilized to frequency-modulate the triode oscillator. The Nth side-band term of the frequency modulation side-band containing the desired harmonic is selectively fed to the output hexode mixer. The oscillator frequency is mixed in the hexode with this side-band component, producing the difference frequency which is the desired harmonic of the input frequency to the pentode. The Bessel function of the Nth term of a frequency modulation side frequency is linear as to amplitude with relation to the amplitude of the modulating frequency. In the circuit of my invention the $f/n$ input is used to frequency modulate any high frequency oscillation. This becomes carrier plus-or-minus $f/n$ plus-or-minus $2f/n$ plus-or-minus $3f/n$ plus-or-minus $n'f/n$. The desired component of the side frequency, i. e. carrier plus $nf/n$ is mixed with carrier in the hexode, giving $nf/n$ or $f$ output which has been derived from $f/n$. The side-bands in the above are spaced $n$ times their respective distances in the output as in the input, if more than one modulating frequency is fed to the input.

I have explained my invention in one of its preferred embodiments but I am fully aware that modifications of the circuit may be made and I intend no limitations upon my invention. I desire that it be understood that various modifications of the circuit and principles of operation explained herein shall be included within the scope of the appended claims.

What I claim as new and desire to secure by Letters Patent of the United States is as follows:

1. A frequency multiplier comprising a source of high frequency energy, a modulator including an electron tube having a cathode, inner grid, screen grid, control grid and anode electrodes, a circuit extending between said source and said control grid and cathode electrodes, an output circuit including said anode, screen grid and said cathode, a frequency modulated oscillator including a cathode, control grid, and anode, a tunable input circuit connected between said last mentioned control grid and said last mentioned cathode, an output circuit for said frequency modulated oscillator connected between the anode thereof and said last mentioned cathode, independent inductively coupled circuits connected in the output circuit of said frequency modulated oscillator, means for coupling the input and output circuits of said frequency modulated oscillator, connections between said last mentioned tunable input circuit and the inner grid and cathode of said modulator, a mixer tube including a cathode, inner grid, screen grid, control grid and an anode, a pair of input circuits connected between the control grid and cathode and the inner grid and cathode respectively of said mixer tube and coupled with the independent inductively coupled circuits in the output circuit of said frequency modulated oscillator, a tunable output circuit connected in series with the anode and cathode of said mixer tube, and means for predetermining the potential of each of said grid electrodes and energizing all of said cathodes and each of said output circuits.

2. A frequency multiplier comprising a source of high frequency energy, a modulator including an electron tube having a cathode, inner grid, screen grid, control grid, and anode electrodes, a circuit extending between said source and said control grid, and cathode electrodes, an output circuit including said anode, screen grid, and cathode, a frequency modulated oscillator including a cathode, control grid, and anode, a tunable input circuit connected between the control grid and cathode of said frequency modulated oscillator, an output circuit coupled with said tunable circuit and extending between the cathode and anode of said frequency modulated oscillator, a pair of tunable circuits connected in said output circuit, an electron coupling between the tunable input circuit of said frequency modulated oscillator through the inner grid and cathode of said modulator, a mixer tube including a cathode, inner grid, control grid, screen grid, and anode, a pair of input circuits extending between said last mentioned tunable circuits and the inner grid and cathode and the control grid and cathode respectively of said mixer tube, a tunable output circuit connected between the anode and cathode of said mixer tube, and means for predetermining the potential of each of said grid electrodes and energizing all of said cathodes and each of said output circuits.

3. A frequency multiplier comprising a source of high frequency energy, an electron tube modulator connected with said source, an electron tube frequency modulated oscillator having coupled input and output circuits, a pair of independently tunable branch circuits disposed in said output circuit of said frequency modulated oscillator, means electronically coupling the input circuit of said electron tube frequency modulated oscillator with said electron tube modulator, a mixer tube including a cathode and anode and a multiplicity of grid electrodes, circuit connections between one of said branch circuits with one of said grid electrodes and the associated cathode, a separate circuit connection between another of said grid electrodes and another of said branch circuits with the associated cathode, a tunable output circuit connected between the anode and cathode of said mixer tube, and means for energizing the circuits of said modulator, frequency modulated oscillator and said mixer tube.

4. In a linear law frequency multiplier circuit, a modulator, a frequency modulated oscillator electronically coupled with said modulator, a mixer circuit having a pair of independently tunable circuits coupled with the output system of said frequency modulated oscillator, a separately tunable circuit connected with the output of said mixer circuit and an output circuit coupled with said separately tunable circuit.

GEORGE H. TAYLOR, JR.

REFERENCES CITED

The following references are of record in the file of this patent:

UNITED STATES PATENTS

| Number | Name | Date |
|---|---|---|
| 1,911,850 | Sandeman et al. | May 30, 1933 |
| 1,957,885 | Grimwood | May 8, 1934 |
| 2,117,739 | Miller | May 17, 1938 |
| 2,159,595 | Miller | May 23, 1939 |
| 2,176,526 | Friend | Oct. 17, 1939 |
| 2,220,689 | Shore | Nov. 5, 1940 |
| 2,230,232 | Crosby | Feb. 4, 1941 |
| 2,299,059 | Sandor | Oct. 13, 1942 |
| 2,361,606 | Crosby | Oct. 31, 1944 |